United States Patent [19]

Kouchi et al.

[11] Patent Number: 5,586,614
[45] Date of Patent: Dec. 24, 1996

[54] SNOW VEHICLE

[75] Inventors: Takao Kouchi; Hideaki Suzuki, both of Saitama, Japan

[73] Assignee: Honda Giken Kogyo Kabushiki Kaisha, Tokyo, Japan

[21] Appl. No.: 350,006

[22] Filed: Nov. 29, 1994

[30] Foreign Application Priority Data

Nov. 29, 1993 [JP] Japan .................................. 5-298407
Sep. 22, 1994 [JP] Japan .................................. 6-254241

[51] Int. Cl.$^6$ ................................................ B62D 55/06
[52] U.S. Cl. .......................... 180/190; 180/9.1; 180/9.25; 305/155; 305/168
[58] Field of Search .................................. 180/182, 190, 180/9.1, 9.25; 305/12, 16, 21, 24, 35 R, 35 EB, 60

[56] References Cited

U.S. PATENT DOCUMENTS

| | | | |
|---|---|---|---|
| 3,111,349 | 11/1963 | Tucker, Sr. ............................ | 180/9.1 X |
| 4,222,453 | 9/1980 | Fixsen et al. .......................... | 305/24 X |
| 4,633,964 | 1/1987 | Boyer et al. .......................... | 180/190 X |
| 5,104,205 | 4/1992 | Motomura et al. ....................... | 305/12 |
| 5,474,146 | 12/1995 | Yoshioka et al. ...................... | 180/190 X |

FOREIGN PATENT DOCUMENTS 58-50914 11/1983 Japan .
1-24673 5/1989 Japan .

Primary Examiner—Brian L. Johnson
Assistant Examiner—Victor E. Johnson

[57] ABSTRACT

A slide rail structure for a snow vehicle includes a main slide rail disposed at the middle of a crawler belt with respect to the width of the crawler belt. A pair of side slide rails are disposed near the opposite side ends, respectively, of the crawler belt. The guide wheels are disposed between the main slide rail and the side slide rails. An appropriate contact load is maintained between the snow vehicle and the snow to thereby enhance the turning ability of the snow vehicle. One or more edges can be provided on a lower surface of the body cover of the snow vehicle. These edges can dig into the snow to compensate for a reduction in the contact force of the affront ski of the snow vehicle with the snow during turning. The front ski of the snow vehicle can be mounted using an elastic, biasing member. This member helps improve timing and responsiveness for turning of the snow vehicle.

14 Claims, 13 Drawing Sheets

SNOW VEHICLE

BACKGROUND OF THE INVENTION

1. Field of the Invention

The present invention relates to a snow vehicle provided with a crawler belt for travel on snow.

2. Background of Related Art

A snow vehicle that travels on snow by means of a crawler belt is disclosed in Japanese Patent Publication (Kokoku) No. Hei. 1-24673.

This known snow vehicle comprises driving wheels driven for rotation by an engine, a pair of slide rails attached to the rear ends of swing arms, guide wheels supported on the slide rails, and a crawler belt wound around the driving wheels, the pair of slide rails and the guide wheels. The snow vehicle travels on snow by the traction of the crawler belt.

FIG. 15 shows the positional relation, as viewed along the longitudinal axis; of this snow vehicle, between the pair of slide rails and the guide wheels. The pair of slide rails 101 are disposed at a distance from the opposite sides, respectively, of the crawler belt 100, and the guide wheels 102 are disposed on the outer sides of the slide rails 101 with respect to the width of the crawler belt 100 to press the lower surface of the crawler belt 100 on the snow.

In this known snow vehicle provided with the crawler belt, the guide wheels Dress the opposite side portions of the crawler belt onto the snow. However, since the guide wheels are round and are arranged at comparatively large longitudinal intervals, resistance against one side of the crawler belt increases when the snow vehicle is banked relative to the surface of snow for turning. Particularly, a portion of the crawler belt in the inner side of the width with respect to the turning direction of the crawler belt and between the guide wheels is bent and the lower surface of the crawler belt is not pressed against the surface of snow at uniform pressure. The crawler belt is therefore unable to transmit the driving force effectively to the snow.

When this known snow vehicle is banked for turning, the body cover is pressed against the snow to reduce the load on the front ski pressing the front ski against the snows and consequently, the front ski is unable to firmly hold to the snow.

Since the ski of this known snow vehicle is joined to the biasing member by welding or with bolts and nuts, the banking action of the vehicle lags momentarily behind the rider's banking operation for turning due to the resistance of snow. Therefore, the timing for turning is difficult.

OBJECTS AND SUMMARY OF THE INVENTION

The present invention is intended to enhance the snow holding resistance and the banking ability (turning ability) of the snow vehicle. Accordingly, a snow vehicle in a first aspect of the present invention comprises driving wheels, a slide rail structure, guide wheels supported on the slide rail structure, and a crawler belt extended along the guide wheels. The slide rail structure comprises a main slide rail extended along the middle of the width of the crawler belt and a pair of side slide rails disposed along the opposite sides, respectively, of the crawler belt. The guide wheels are arranged between the main slide rail and the side slide rails.

A snow vehicle in a second aspect of the present invention comprises driving wheels, a slide rail structure, guide wheels supported on the slide rail structure, a crawler belt extended along the guide wheels, and a body cover, in which the body cover is provided on the right and the left portion of the lower surface thereof with longitudinal edge members protruding downward from the lower surface of the body cover.

A snow vehicle in a third aspect of the present invention comprises driving wheels, a slide rail structure, guide wheels supported on the slide rail structure, a crawler belt extended along the guide wheels, and a ski pivotally supported on the front portion of the body cover by a biasing member. An elastic member is interposed between the biasing member and the ski.

Since the side slide rails are extended near the opposite sides with respect to the width of the crawler belt, the lower surface of the crawler belt is held in uniform contact with the snow. The longitudinal edge members longitudinally extended along the right and the left side portion of the lower surface of the body cover and project downwardly from the lower surface of the body cover to dig into the snow when the snow vehicle turns. A rubber bush, the elastic member, interposed between the biasing member and the ski allows the ski to incline with respect to the direction of the width relative to the biasing member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
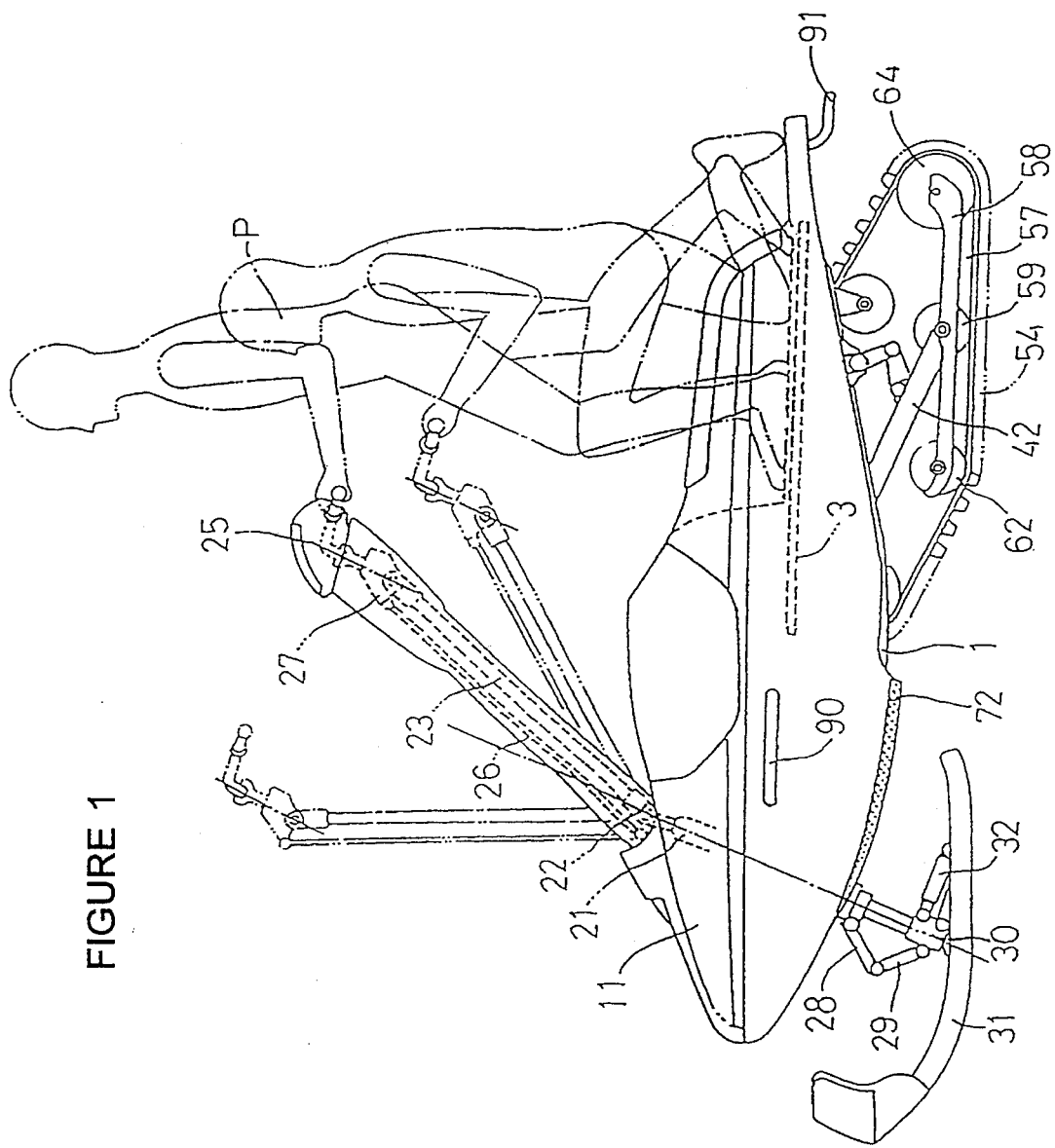
FIG. 1 is a side view of a snow vehicle in a first embodiment according to the present invention.

Preferred embodiments of the present invention will be described hereinafter with reference to the accompanying drawings. Turning to FIGS. 1–5, views of a snow vehicle of a first embodiment according to the present invention are shown. The snow vehicle has main frames 1 formed by assembling pipes and an upper frame 2 extended over the front portions of the main frames 1. A floor 3, serving also as a body and a heat exchanger, is extended between the rear end of the upper frame 2 and the rear ends of the main frames 1. A head pipe 4 is joined to the respective front ends of the main frame 1 and the upper frame 2. An engine 5 is mounted on the main frames 1 in a space surrounded by the main frames 1 and the upper frame 2. A transmission case 6 is disposed behind the engine 5. An air cleaner 7, a carburetor 8 and a fuel tank 9 are arranged over the transmission case 6. A muffler 10 is disposed in front of and attached to the head pipe 4. These members are covered with a body cover 11.

Grips 90 are attached to the opposite side surface of the body cover 11, respectively, and a grip 91 is attached to the rear end of the floor 3.

A front shock absorbing unit 20 is inserted in the head pipe 4. The lower member 21 of a steering post is joined to the upper end of the front shock absorbing unit 20. The upper member 23 of the steering post is joined to a universal joint 22 which is joined to the upper end of the lower member 21. A handlebar 25 is joined to a universal joint 24 which is joined to the upper end of the upper member 23. A steering link 26 is extended in front of and in parallel to the upper member 23 and the lower end of the steering link 26 is pivotally joined at the lower end thereof to the body of the snow vehicle so that the steering link 26 is able to swing in a vertical plane, and the upper end of the steering link 26 is connected to a bracket 27 holding the handlebar 25. The upper member 23 of the steering post, the handlebar 25 and the steering link 26 form a parallel linkage. The parallel linkage maintains the handlebar 25 in a fixed inclination even if the height of the handlebar 25 is adjusted according to the riding position of a rider P.

Figure 13:
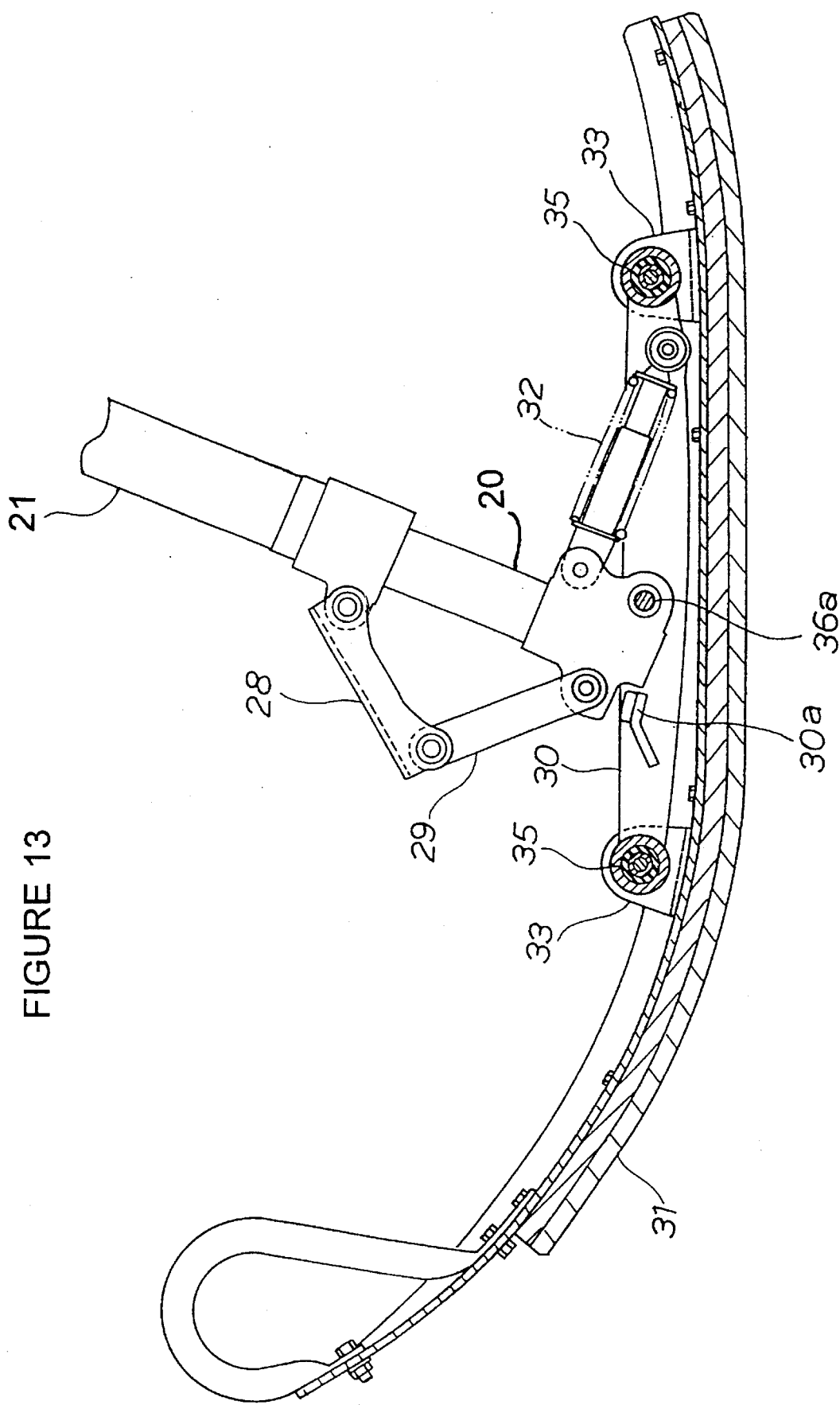
FIG. 13 is an enlarged side view of a front understructure included in the snow vehicle of FIG. 6.

The outer cylinder of the front shock absorbing unit 20 transmits steering force through links 28 and 29 to a ski holder 30 holding a front ski 31. The angular range of turning of the front ski 31 relative to the front shock absorbing unit 20 is determined by an auxiliary shock absorber, biasing means, 32 and a stopper 30a attached to the ski holder 30 as shown in FIG. 13. The auxiliary shock absorber 32 biases the front ski 31 so that the front portion of the front ski 31 is raised.

Figure 3:
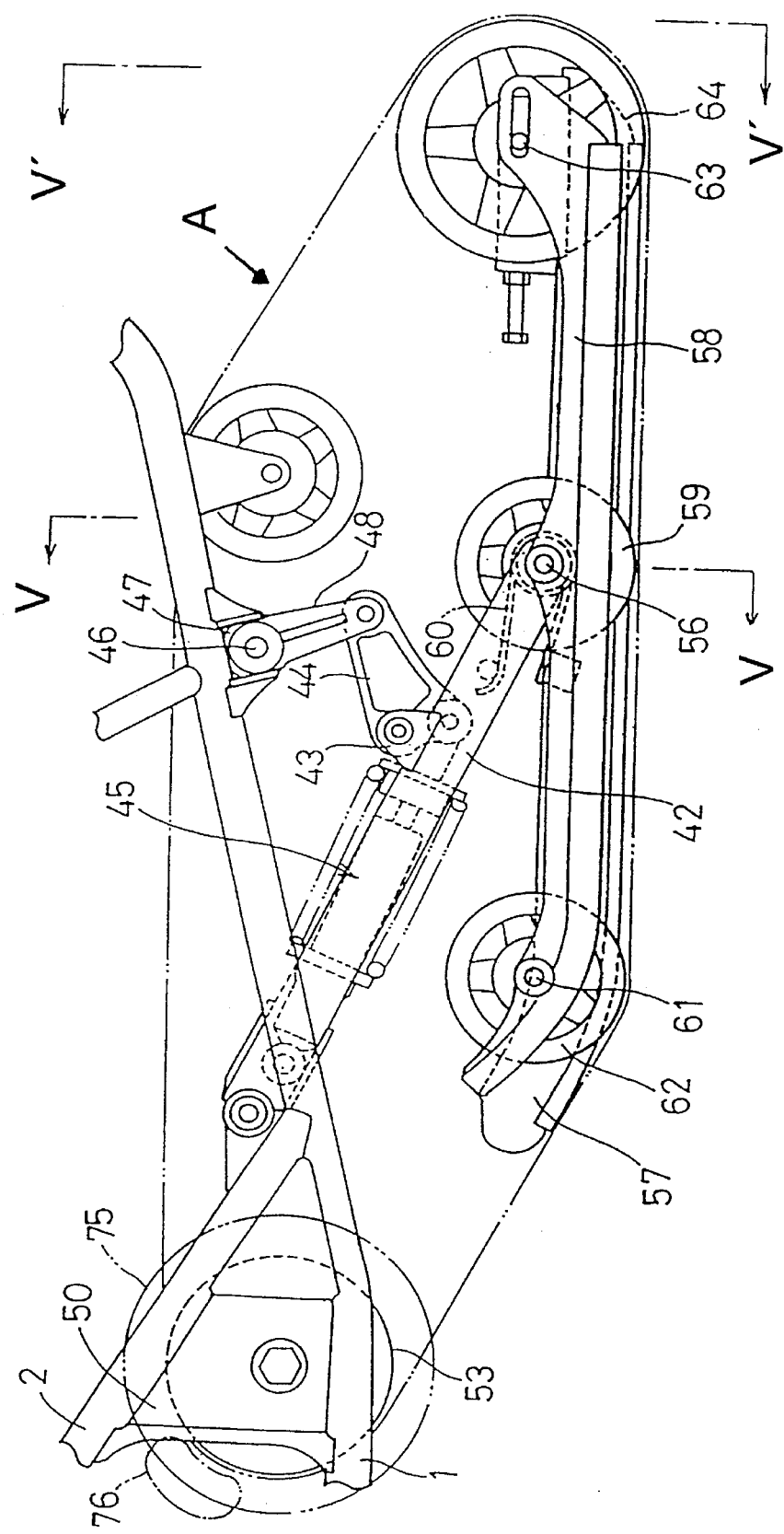
FIG. 3 is an enlarged side view of a rear understructure included in the snow vehicle of FIG. 1.
Figure 4:
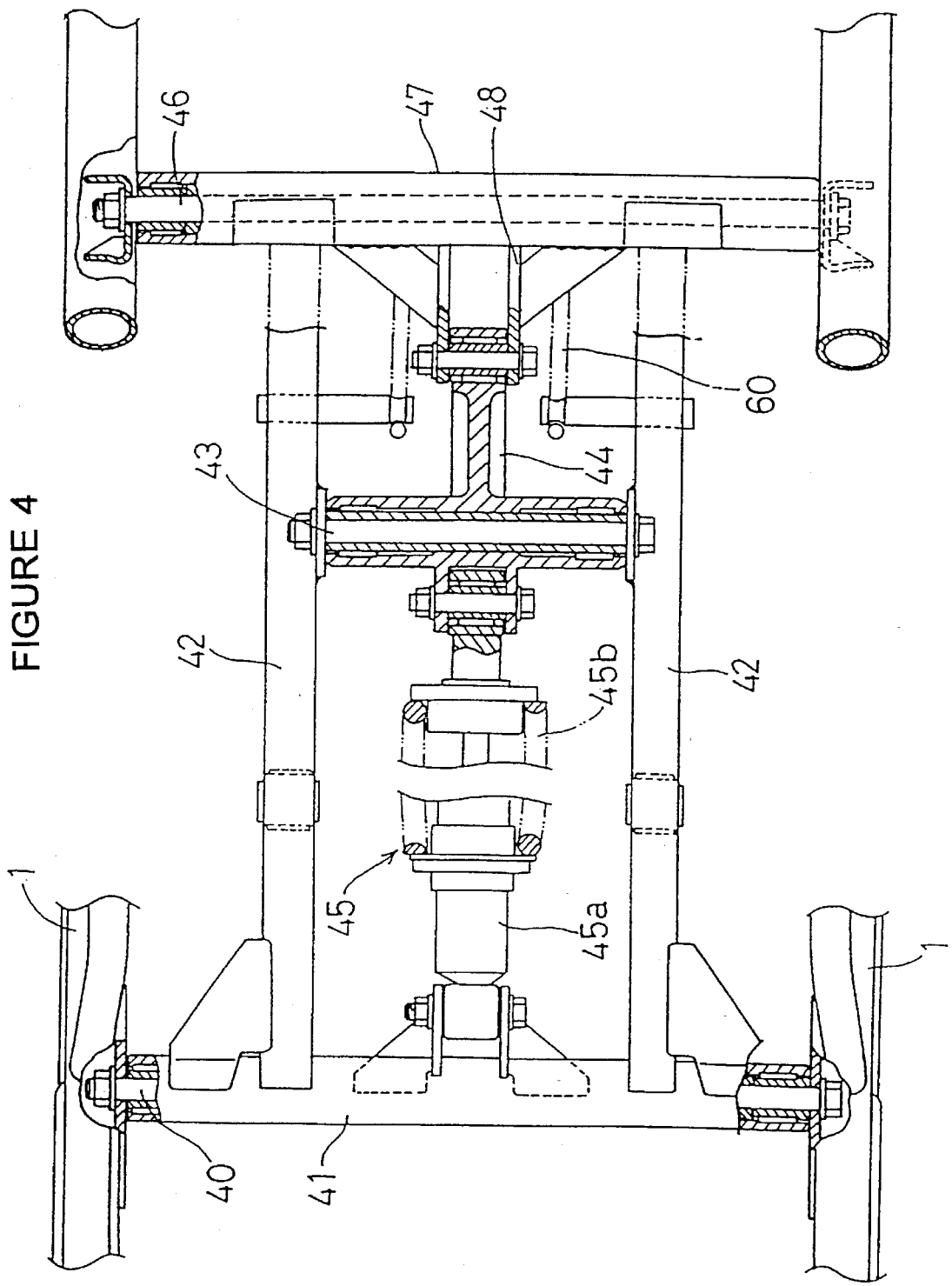
FIG. 4 is a view taken along the direction of the arrow A in FIG. 3.

A driving system will be described hereinafter with reference to FIGS. 3 to 5.

A shaft 40 is extended between the respective middle portions of the right main frame 1 and the left main frame 1, and a cross pipe 41 included in a swing arm is supported for turning on the shaft 40. The respective front ends of a pair of main pipes 42 of the swing arm are fixed to the cross pipe 41. A shaft 43 is extended between the respective middle portions of the pair of main pipes 42, and a triangular link plate 44 is pivotally joined to the shaft 43.

A rear shock absorbing unit 45 has a front end joined to the middle portion of the cross pipe 41 extending between the front ends of the main pipes 42, and a rear end joined to one corner of the triangular link plate 44. A shaft 46 is extended between the middle portions of the main frames 1, and a cross pipe 47 is supported for turning on the shaft 46. A link 48 has an upper end joined to the cross pipe 47 and a lower end connected to another corner of the triangular link plate 44.

A progressive linkage is thus formed and the stroke of the rear shock absorbing unit 45 increases progressively as the swing arm turns upward.

Figure 5:
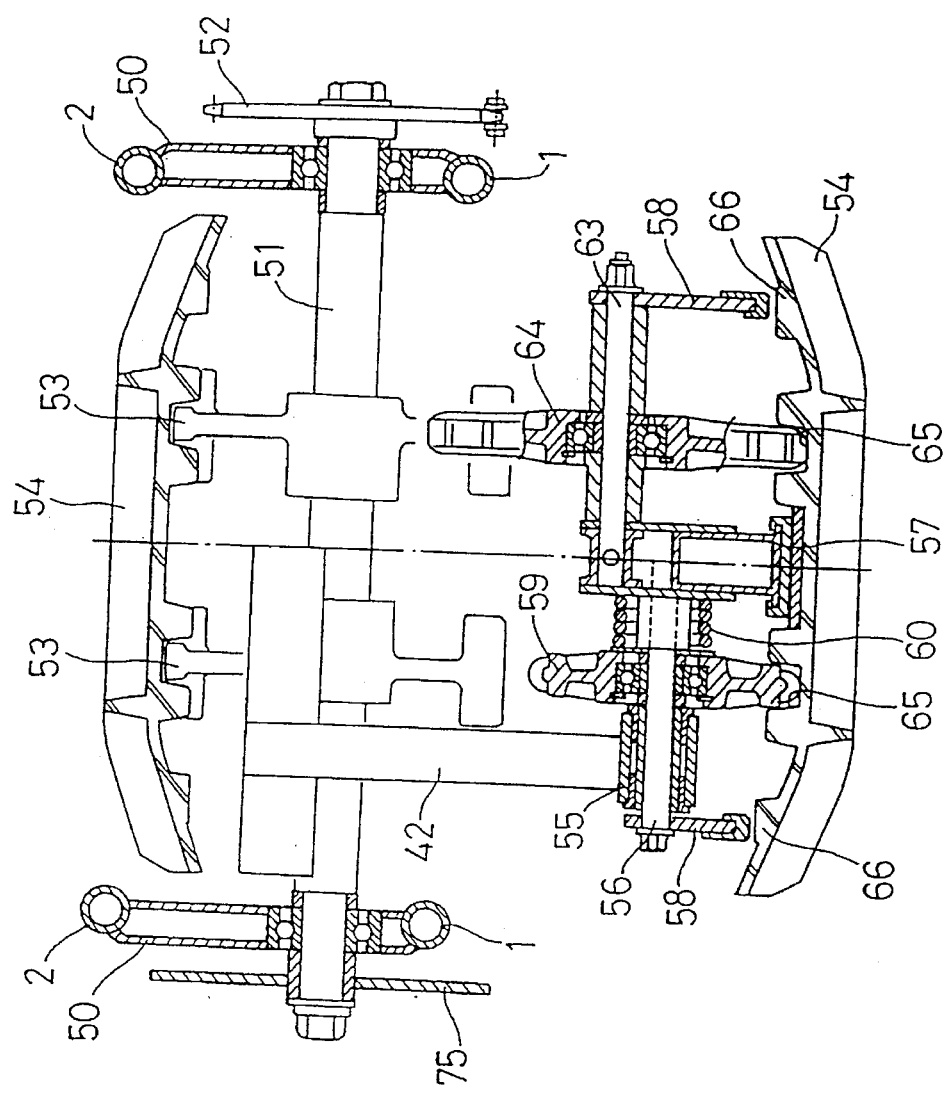
FIG. 5 is a view taken in the direction of the arrows along line V—V, on the right side, and a view taken in the direction of the arrows along line V'—V', on the left side, in FIG. 3.

As shown in FIG. 5, gussets 50 are attached to the main frames 1 and the upper frame 2 at positions near the joints of the main frames 1 and the upper frame 2. A driving shaft 51 is extended between and supported for rotation on the gussets 50. A driven sprocket 52 is fixed to one end of the driving shaft 51, and the driven sprocket 52 is connected to the output shaft of a transmission supported on the transmission case 6 by a chain. A brake disk 75 is fixed to the other end of the driving shaft 51, and a brake caliper 76 is disposed near and in combination with the brake disk 75 as shown in FIG. 3. Toothed driving wheels 53 are splined to the middle portion of the driving shaft 51. The teeth of the driving wheels 53 mesh with grooves between teeth formed on the bottom side of a crawler belt 54.

A bearing 55 is extended between the rear ends of the main pipes 42 of the swing arm. A shaft 56 is supported for rotation in the bearing 55. A longitudinal main slide rail 57 is attached to the middle portion of the shaft 56. A pair of side slide rails 58 are attached to the opposite ends, respectively, of the shaft 56.

Guide wheels 59 are supported for rotation on the shaft 56 at positions on the inside of the side slide rails 58. A spring 60 is mounted on the shaft 56 at a position on the inside of the guide wheels 59 so as to bias the front portion of the main slide rail downward. A shaft 61 is extended through the respective front ends of the main slide rail 57 and the side slide rails 58. Guide wheels 62 are supported for rotation on the shaft 61. A shaft 63 is extended through the respective rear ends of the main slide rail 57 and the side slide rails 58. Guide wheels 64 are supported for rotation on the shaft 63. The diameter of the guide wheels 64 is greater than that of the guide wheels 62, and the positions of the guide wheels 64 on the shaft 63 are adjustable.

The guide wheels 59, 62 and 64 mesh with grooves 65 formed in the bottom side of the crawler belt 54. A small clearance is formed between the lower surface of the main slide rail 57 and the middle portion of the bottom side of the crawler belt 54, and a small clearance is formed between the lower surface of each side slide rail 58 and a ridge 66 formed on the bottom side of the crawler belt 54 near the side edge of the crawler belt 54.

Figure 2:
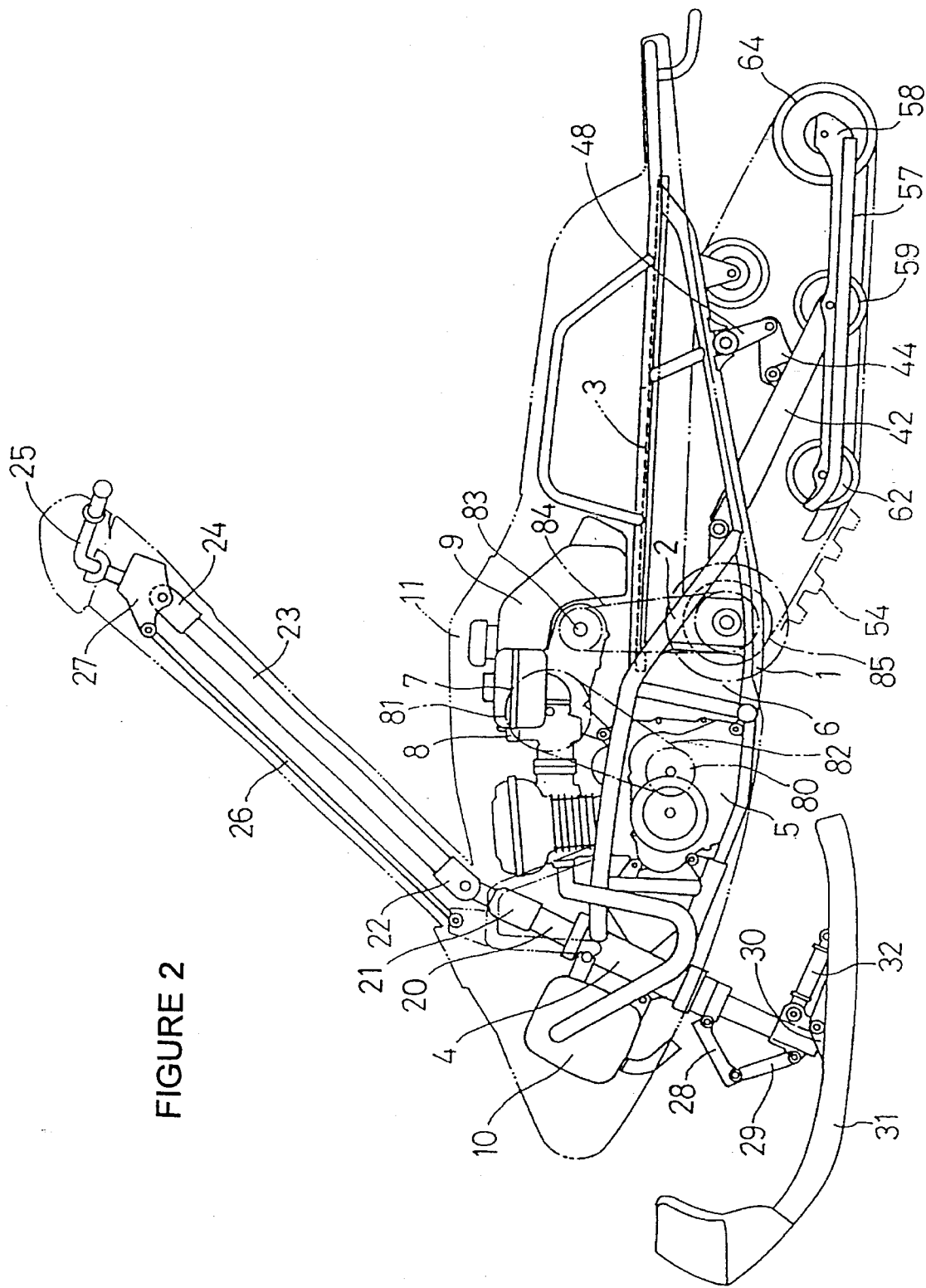
FIG. 2 is a side view of the snow vehicle of FIG. 1 in which a body cover is removed.

Referring to FIG. 2, the output power of the engine 5 is transmitted to the driving pulley 80 of a belt-and-pulley torque converter to rotate the driving pulley 80. The rotation of the driving pulley 80 is transmitted by a belt 82 to a driven pulley 81, the rotation of the driven pulley 81 is transmitted to an idle shaft 83, and then the rotation of the idle shaft 83 is transmitted by a chain 84 to the driving wheels 53. Then, the driving wheels 53 drive the crawler belt 54 to drive the snow vehicle for traveling. When the snow vehicle travels on a soft surface of snow, the crawler belt 54 sinks in the snow and the side portions of the crawler belt 54 are in contact with the lower surfaces of the side slide rails 58 so that pressure is applied uniformly to the crawler belt 54 to increase effective driving force acting on the crawler belt 54.

When the snow vehicle travels on a comparatively hard surface of snow, the clearances between the lower surfaces of the side slide rail 58 and the bottom side of the crawler belt 54 are maintained, and hence the running resistance is small.

Figure 6:
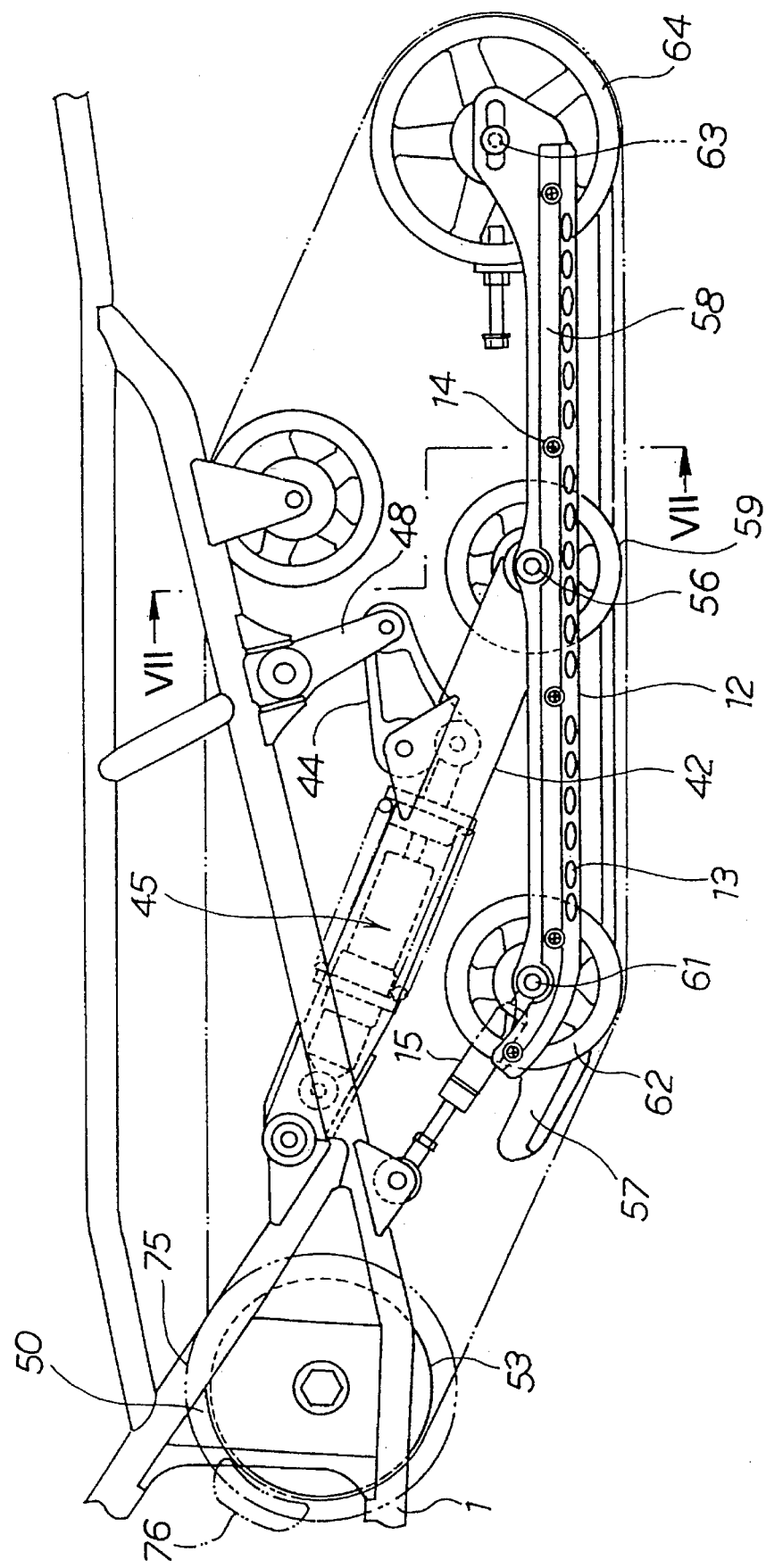
FIG. 6 is an enlarged side view of a rear understructure included in a snow vehicle in a second embodiment according to the present invention.
Figure 7:
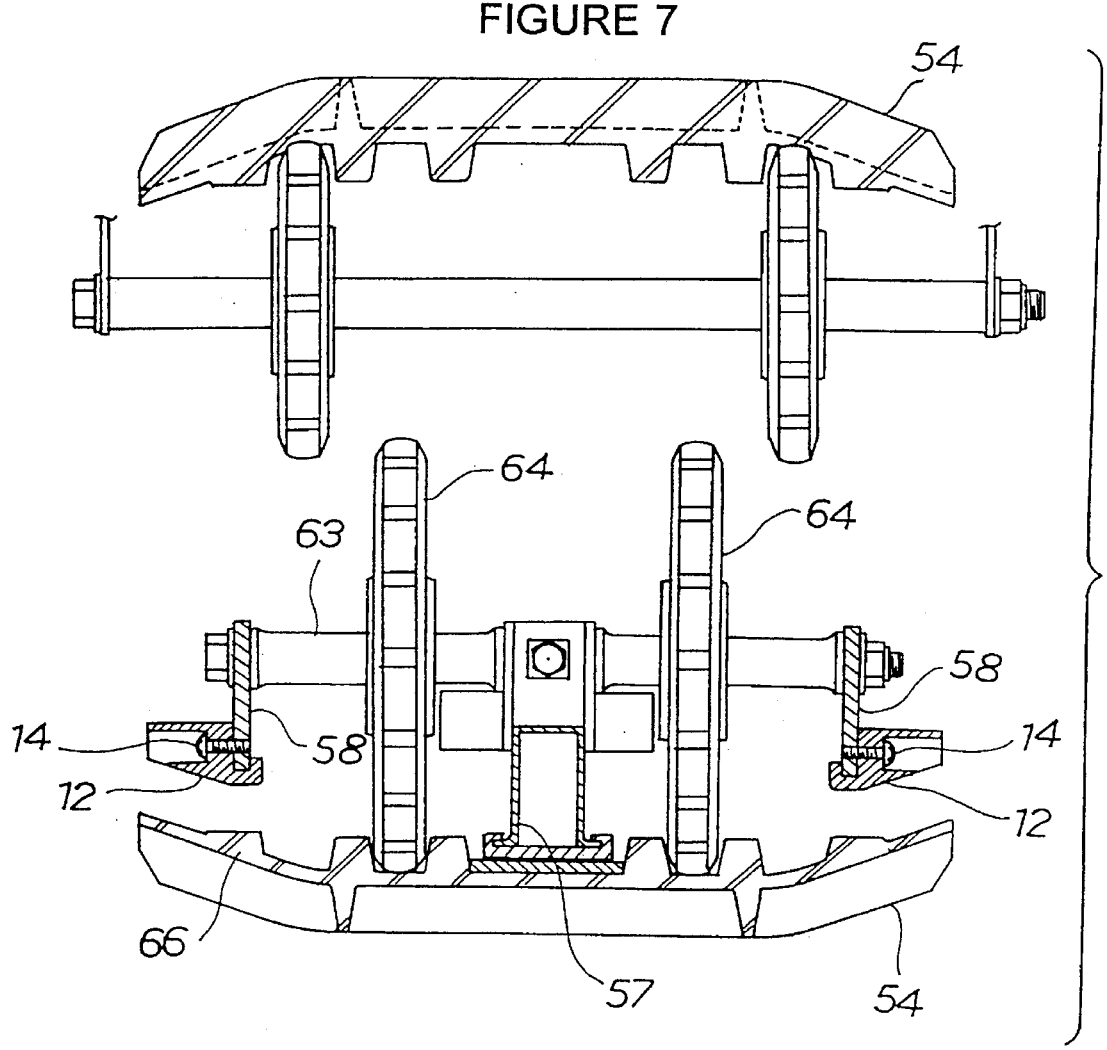
FIG. 7 is a sectional view taken on line VII—VII in FIG. 6.

FIG. 6 is an enlarged side view of the rear understructure of a snow vehicle in a second embodiment according to the present invention, and FIG. 7 is a sectional view taken on line VII—VII in FIG. 6. In FIGS. 6 and 7, parts like or corresponding to those shown in FIGS. 1 to 5 are designated by the same reference characters and the description thereof will be omitted.

In the second embodiment, side slide rails 58 are provided respectively with sliders 12. The shape of the lower surface of each slider 12 is substantially the same as that of a ridge 66 formed on the bottom side of a crawler belt 54 at a position on the inside of the edge of the crawler belt 54. The slider projects outward from the side slide rail 58 and the extremity of the slider 12 is substantially flush with the edge of the crawler belt 54 as viewed from behind the snow vehicle. Each slider 12 is formed of a resin and is provided with a plurality of oval holes 13 longitudinally arranged at given intervals to form the slider 12 as a lightweight member. Each slider 12 is fastened to the side slide rail 58 with screws 14 at a plurality of positions as shown in FIG. 6.

The sliders 12 having such a shape are able to press the entire side portions of the crawler belt 54 when the snow vehicle banks and, consequently, the turning ability and the controllability of the snow vehicle are enhanced. Since the sliders 12 come into contact with the bottom side of the crawler belt 54 in a wide area, pressure that acts on the sliders 12 is distributed, and hence the sliders 12 has a long service life.

The snow vehicle in the second embodiment is provided with a pair of dampers 15 which are extended between main frames 1 and a shaft 61 to improve the controllability of the snow vehicle by limiting the range of swing motion of a traction structure comprising a main slide rail 57, side slide rails 58 and guide wheels 59, 62 and 64 by the dampers 15.

Figure 8:
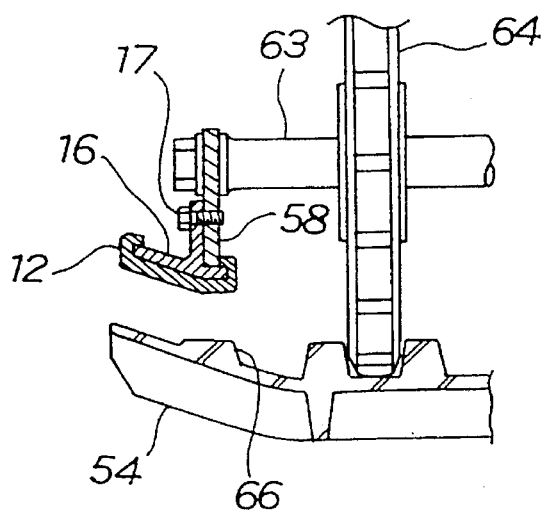
FIG. 8 is a modification of a slider employed in the snow vehicle of FIG. 6.

A modification of the slider is shown in FIG. 8, in which parts like or corresponding to those shown in FIG. 7 are designated by the same reference characters. As shown in FIG. 8, a resin slider 12 is put on a core member 16 having a cross section resembling the letter T formed by extruding aluminum and fastened to the core member 16 with screws, not shown, and the core member 16 is fastened to a side slide rail 58 with bolts 17 at a plurality of positions. The shape of the lower surface of the slider 12 is substantially the same as that of the bottom side of a crawler belt 54. The outer extremity of the slider 12, similar to that of the slider 12 of the second embodiment, is substantially flush with the edge of the crawler belt 54 as viewed from behind the snow vehicle.

Figure 9:
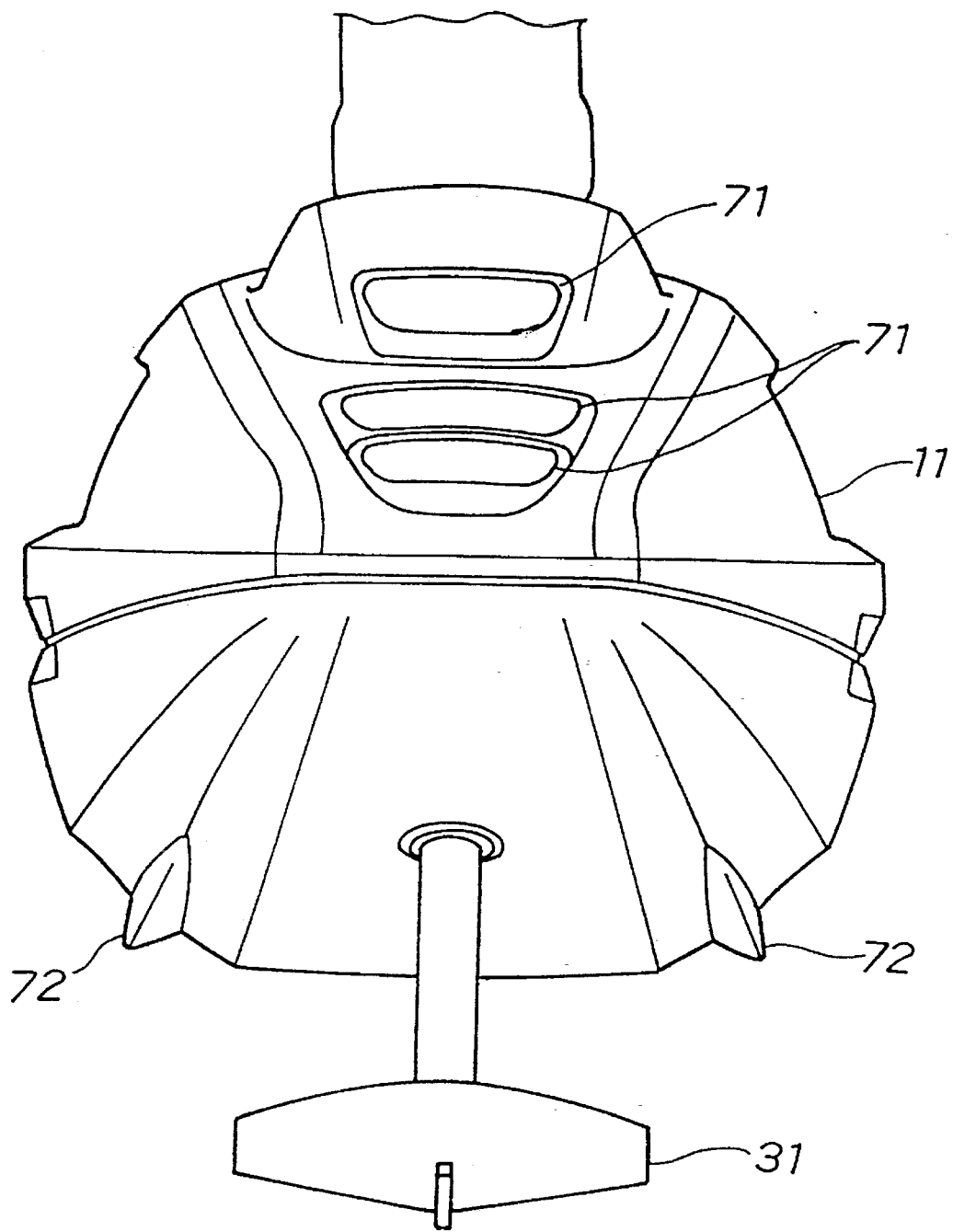
FIG. 9 is a front view of a body cover.

FIG. 9 is a front view of the body cover 11. An opening 70 is formed in a central portion of the bottom wall of the body cover 11 and the front shock absorbing unit 20, as shown in FIG. 2, extends through the opening 70. Cooling air inlet openings 71 are formed in the front portion of the body cover 11. Edges 72 extend longitudinally in the side portions, respectively, of the lower surface of the body cover 11.

Figure 10:
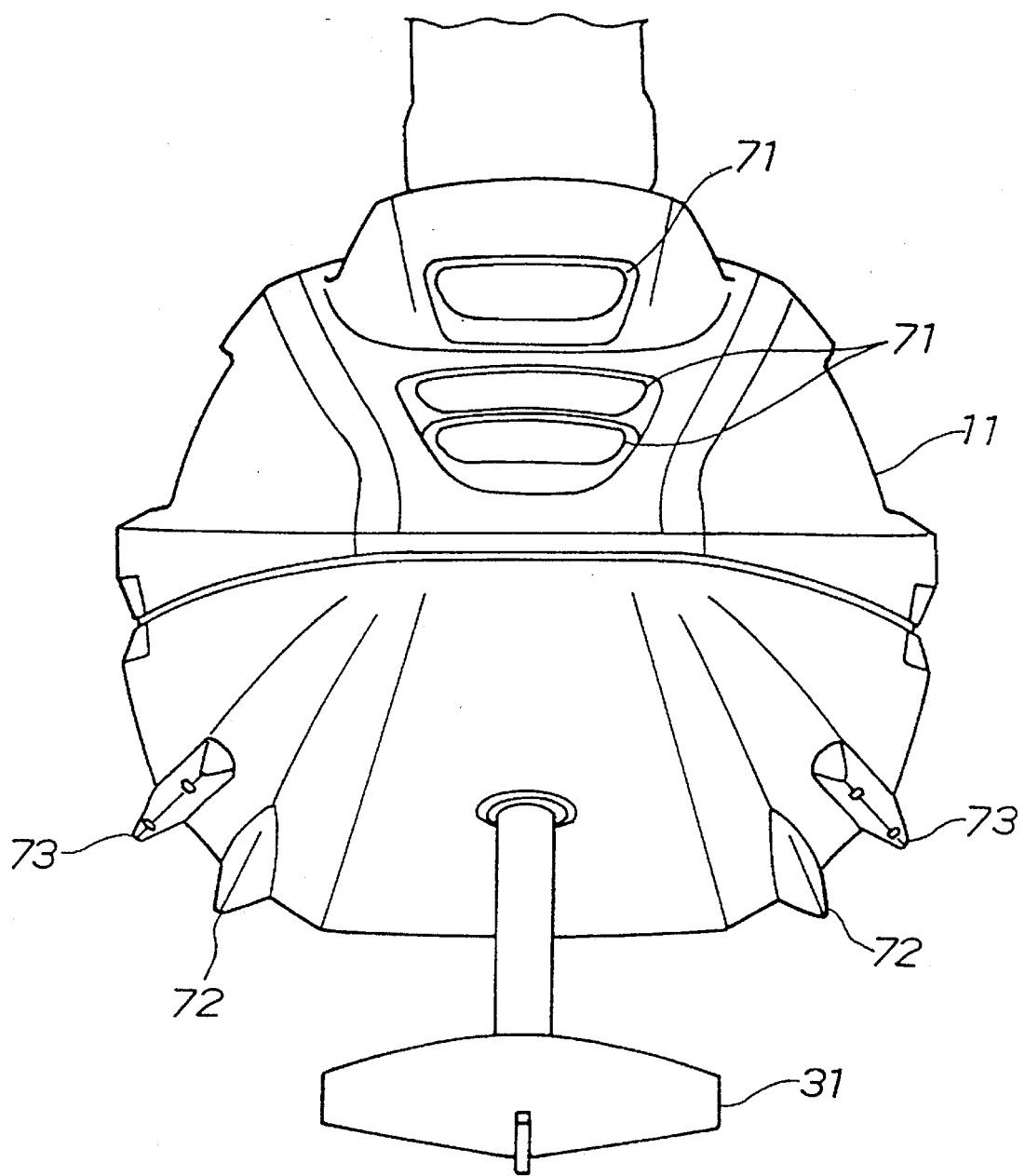
FIG. 10 is a front view of another body cover in accordance with the present invention.

In a modification of the body cover 11, edge members 73 may be attached to the body cover 11 as shown in FIG. 10.

Figure 11:
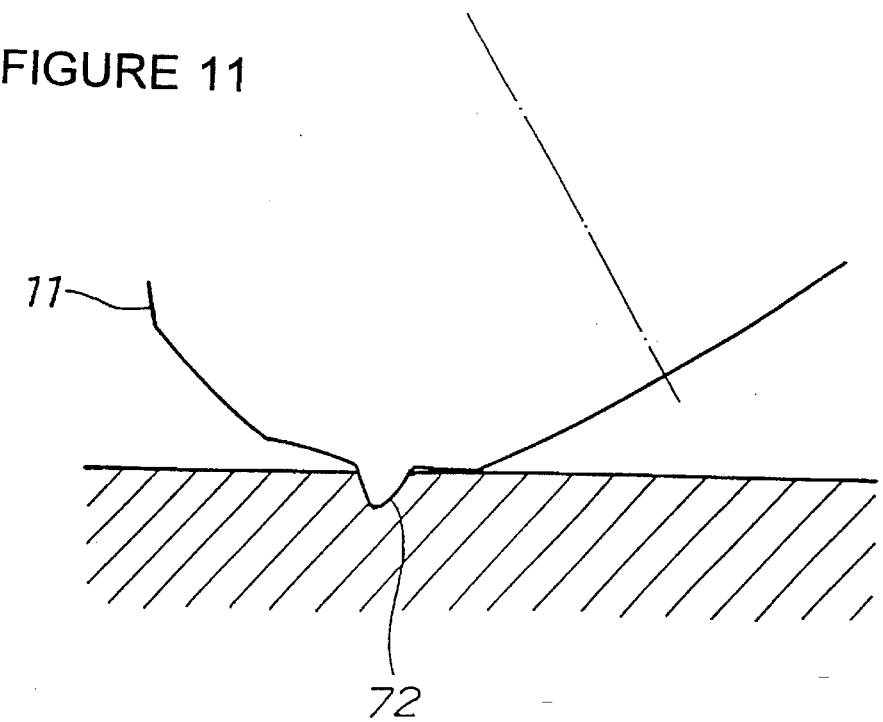
FIG. 11 is a diagrammatic view for explaining the function of the body cover of FIG. 9 when the snow vehicle is banked.
Figure 12:
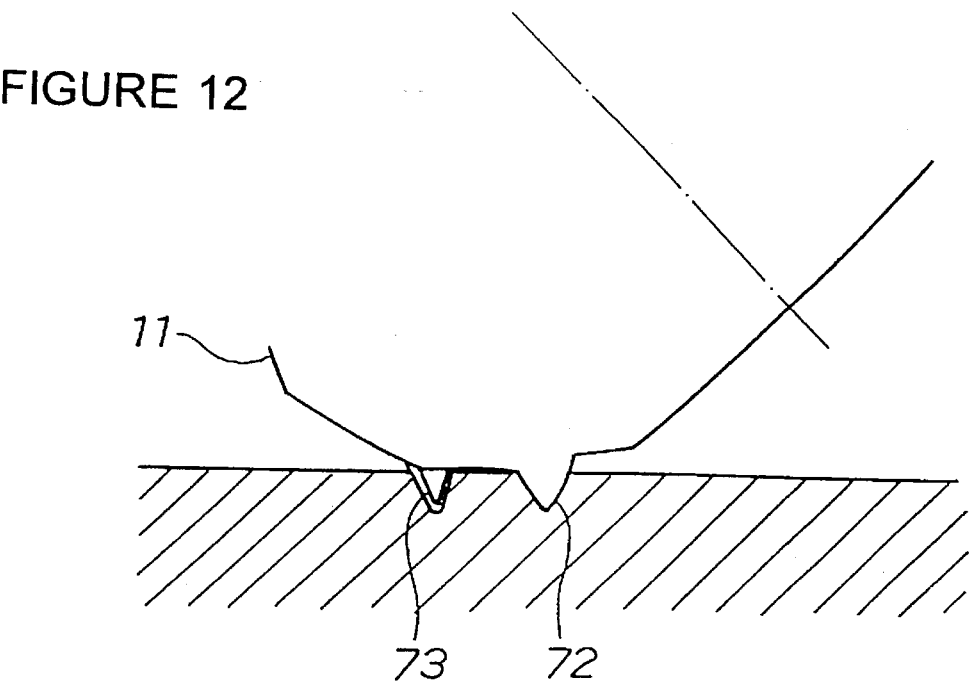
FIG. 12 is a diagrammatic view for explaining the function of the body cover of FIG. 10 when the snow vehicle is banked.

When the body cover 11 is provided with the edges 72 or the edge members 73 in the side portions of the lower surface thereof, the edges 72 or the edge members 73 dig into the snow as shown in FIG. 11 or 12 when the snow vehicle turns to compensate for the reduction of the contact load of the front ski on the snow.

The size of the edge members 73 is determined properly for the proper digging of the edge members 72, 73 into the snow when the snow vehicle turns.

Figure 14:
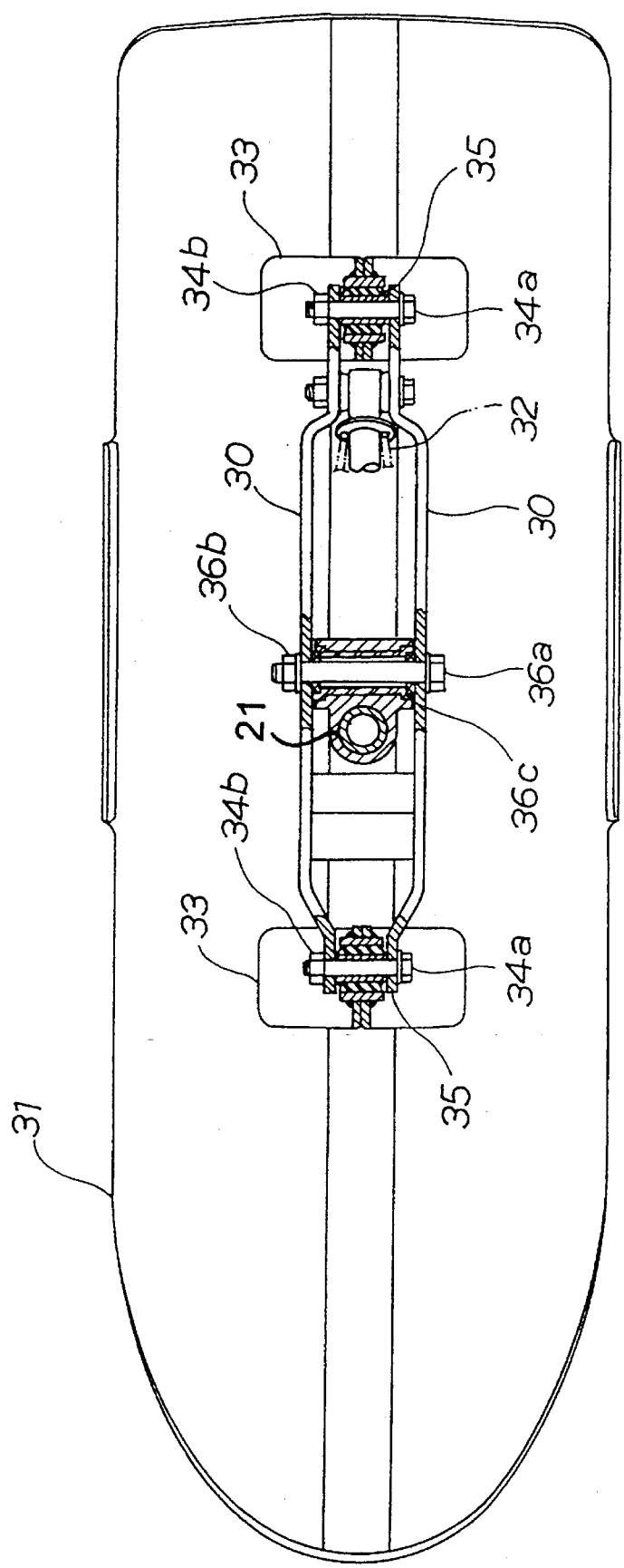
FIG. 14 is an enlarged plan view of a front understructure of the snow vehicle of FIG. 6.
Figure 15:
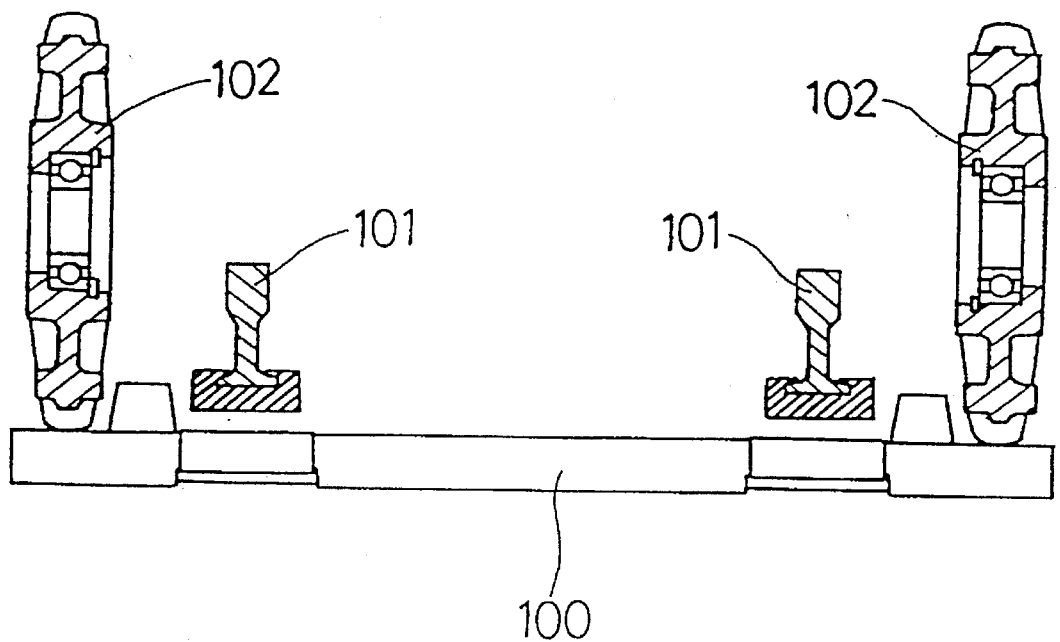
FIG. 15 is a front view of a conventional snow vehicle showing the positional relation between slide rails and guide wheels.

FIG. 13 is an enlarged side view of the front understructure of a snow vehicle and FIG. 14 is a plan view of the front understructure shown in FIG. 13, in which parts like or corresponding to those shown in FIGS. 1 to 5 are designated by the same reference characters and the description thereof will be omitted.

In this embodiment, a ski holder 30 supporting the lower member 21 of a steering post at the lower end thereof is joined, instead of being directly welded to a front ski 31, to brackets 33 attached to the front ski 31 so as to be able to turn and to swing laterally.

The brackets 33 are disposed on the longitudinal axis of the front ski 31 at an interval substantially equal to the distance between the opposite longitudinal ends of the ski holder 30 and are welded to the front ski 31. Rubber bushes 35 are forced into holes formed in the brackets 33, respectively. The ski holder 30 consists of two rectangular plates respectively having middle portions separated from each other. The ski holder 30 is disposed with its longitudinal axis in alignment with the longitudinal axis of the front ski 31 and the opposite longitudinal ends of the same are joined to the brackets 33 with bolts 34a and nuts 34b, respectively.

The lower end of the lower member 21 is joined pivotally to the expanded middle portion of the ski holder 30 with a bolt 36a, a nut 36b and a collar 36c. An auxiliary shock absorbing unit 32 has one end joined to the lower end of the lower member 21 and the other end joined to the rear narrow portion of the ski holder 30.

The front ski 31 thus held by the ski holder 30 is able to turn relative to the front shock absorbing unit 20, and to swing slightly in the banking direction of the snow vehicle due to the elasticity of the rubber bushes 35.

As is apparent from the foregoing description, in the first aspect of the present invention, the slide rail structure comprises the main slide rail disposed in the middle portion of the crawler belt with respect to the width of the crawler belt, and the pair of side slide rails are disposed near the opposite sides of the crawler belt, respectively. Accordingly, the crawler belt can be uniformly pressed against the snow when the crawler belt sinks in the snow and the running resistance increases, and hence the crawler belt is able to use the driving force efficiently.

Particularly, the clearances formed between the lower surfaces of the side slide rail and the crawler belt reduces the running resistance when the snow vehicle travels in a normal traveling mode in which the crawler belt does not sink in the snow.

The sliders attached to the lower surfaces of the side slide rails so that the extremities of portions thereof extending laterally outward are flush with the corresponding edges of the crawler belt as viewed from behind the sliders enable the snow vehicle to effectively press the entire width of the crawler belt against the surface of the snow when the snow vehicle banks, which enhances the turning ability and the controllability of the snow vehicle. Furthermore, since the lower surfaces of the sliders have a large area, the pressure applied by the crawler belt to the sliders is distributed in a wide area, so that the sliders have a long service life.

In the second aspect of the present invention, since the body cover of the snow vehicle is provided on its lower surface with the edge members projecting downward from the lower surface, the edge members dig into the snow when the snow vehicle turns to suppress the reduction of the contact load of the front ski.

Furthermore, in the third aspect of the present invention, since elastic members are interposed between the biasing member and the ski, the snow vehicle can be banked in an instant when the rider tries to bank the snow vehicle regardless of the motion of the ski on which the resistance of snow acts. Timing for turning is easy and the snow vehicle is easily controllable. Still further, if the ski holder is joined to the ski by welding or the like, the rigidity of a portion of the ski holder is higher than the other portion of the same and stress concentration occurs in portions of the ski near the ski holder. In the third aspect of the present invention, since the ski holder is joined through the rubber bushes to the ski, stress is distributed over the entire length of the ski which is advantageous with respect to strength.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A snow vehicle comprising:
   a slide rail structure;
   a plurality of pairs of guide wheels supported on the slide rail structure; and
   a crawler belt supported and guided on a lower surface thereof by said guide wheels;
   wherein the slide rail structure includes
      a main slide rail supporting a longitudinal center portion of said crawler belt, and
      a pair of side slide rails being disposed respectively along opposed longitudinal side portions of said crawler belt,
   wherein said guide wheels are laterally disposed between said side slide rails,
   wherein a clearance is provided between said crawler belt and each side slide rail, and
   wherein said crawler belt selectively engages at least one of said side slide rails when the corresponding clearance is closed between said crawler belt and the at least one side slide rail by deflection of said crawler belt.

2. The snow vehicle according to claim 1, wherein each of the side slide rails includes a slider provided on a lower surface of each side slide rail, each of the sliders having a shape on a lower surface of the slider which substantially corresponds to a shape of an inside surface of the crawler belt, wherein the sliders extend laterally outward so that a laterally outermost extremity of the sliders coincides with an edge of the crawler belt.

3. The snow vehicle according to claim 2, wherein each of the sliders are made of resin and are detachably mounted to the side slide rails, the lower surfaces of the sliders being frictionally engageable with the inside surface of the crawler belt.

4. The snow vehicle according to claim 2, wherein each of the sliders is a resin slider on a core member, the core members generally having a t-shaped cross section and the core members being detachable mounted to the side slide rails, the lower surfaces of the sliders being frictionally engageable with the inside surface of the crawler belt.

5. The snow vehicle according to claim 1, wherein each of the side slide rails has a slider, the sliders extending longitudinally along the side rails and having a plurality of holes provided therein.

6. The snow vehicle according to claim 1, wherein said crawler belt includes grooves disposed on an inside longitudinal surface of said crawler belt wherein said guide wheels ride along said grooves.

7. The snow vehicle according to claim 1, wherein said crawler belt includes ridges disposed on an inside longitudinal surface of said crawler belt wherein the ridges of said crawler belt ride along at least one of the side slide rails when said crawler belt is deflected towards the at least one side slide rail.

8. A vehicle having a frame and a motor comprising:
   a crawler belt driven by the motor;
   a first pair of guide wheels rotatably disposed on a first shaft;
   a second pair of guide wheels rotatably disposed on a second shaft;
   a third pair of guide wheels rotatably disposed on a third shaft;
   wherein said first, second and third pairs of guide wheels collectively support and guide said crawler belt;
   a main slide rail supporting a longitudinal center section of said crawler belt;
   a left side slide rail selectively supporting a left longitudinal side section of said crawler belt; and
   a right side slide rail selectively supporting a right longitudinal side section of said crawler belt;
   wherein said guide wheels are laterally disposed between said left side slide rail and said right side slide rail.

9. The vehicle according to claim 8, further comprising:
   first clearance provided between said crawler belt and said left side slide rail; and
   a second clearance provided between said crawler belt and said right side slide rail,
   wherein when said first clearance is reduced to zero by deflection of said crawler belt towards said left side slide rail, said left side slide rail supports the left longitudinal side section of said crawler belt,
   wherein when said second clearance is reduced to zero by deflection of said crawler belt towards said right side slide rail, said right side slide rail supports the right longitudinal side section at said crawler belt.

10. The vehicle according to claim 8, wherein said left side slide rail and said right side slide rail include a core member and a slider, each of the sliders having a lower surface shape which substantially corresponds to a shape of a respective longitudinal side section of said crawler belt.

11. The vehicle according to claim 10, wherein the sliders are made of a resin material.

12. The vehicle according to claim 10, wherein the sliders have a plurality of holes provided therein.

13. The vehicle according to claim 8, wherein said crawler belt includes a first and second ridges disposed on respective left and right inside longitudinal surfaces of said crawler belt wherein said left side slide rail rides along said first ridge when a left longitudinal portion of said crawler belt is deflected and wherein said right side slide rail rides along said second ridge when a right longitudinal portion of said crawler belt is deflected.

14. The vehicle according to claim 8, wherein said crawler belt includes a pair of grooves disposed on an inside longitudinal surface of said crawler belt wherein said first, second and third pairs of guide wheels ride along said grooves.

* * * * *